US011700299B2

(12) United States Patent
Nagata et al.

(10) Patent No.: US 11,700,299 B2
(45) Date of Patent: Jul. 11, 2023

(54) INFORMATION PROCESSING APPARATUS, INFORMATION PROCESSING SYSTEM, NON-TRANSITORY COMPUTER-READABLE MEDIUM, AND INFORMATION PROCESSING METHOD

(71) Applicant: Mitsubishi Electric Corporation, Tokyo (JP)

(72) Inventors: Ayako Nagata, Tokyo (JP); Junji Sukeno, Tokyo (JP); Masahide Koike, Tokyo (JP); Susumu Iino, Tokyo (JP); Keiichi Tsuda, Tokyo (JP); Kiyoyasu Maruyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 65 days.

(21) Appl. No.: 17/310,218

(22) PCT Filed: Feb. 5, 2019

(86) PCT No.: PCT/JP2019/003985
§ 371 (c)(1),
(2) Date: Jul. 27, 2021

(87) PCT Pub. No.: WO2020/161788
PCT Pub. Date: Aug. 13, 2020

(65) Prior Publication Data
US 2022/0321644 A1 Oct. 6, 2022

(51) Int. Cl.
*H04L 67/1001* (2022.01)
*H04L 67/60* (2022.01)

(52) U.S. Cl.
CPC ......... *H04L 67/1001* (2022.05); *H04L 67/60* (2022.05)

(58) Field of Classification Search
CPC .......................... H04L 67/1001; H04L 67/60
See application file for complete search history.

(56) References Cited

U.S. PATENT DOCUMENTS 7,451,344 B1 * 11/2008 Rothberg ............. G11B 20/182
714/6.1
10,026,045 B1 * 7/2018 Portnoy ................. G06Q 10/06
(Continued)

FOREIGN PATENT DOCUMENTS

JP 60-77258 A 5/1985
JP 2-68651 A 3/1990
(Continued)

OTHER PUBLICATIONS

International Search Report and Written Opinion dated May 14, 2019, received for PCT Application PCT/JP2019/003985, Filed on Feb. 5, 2019, 9 pages including English Translation.
(Continued)

*Primary Examiner* — Kostas J Katsikis
(74) *Attorney, Agent, or Firm* — Xsensus LLP

(57) ABSTRACT

Provided are a request processing unit to send a first process distribution request to other information processing apparatuses via a communication I/F unit, the first process distribution request being a request for ordering execution of a first process on a first; and an order destination selecting unit to receive, via the communication I/F unit, as a response to the first process distribution request, a first estimated reply time calculated as the time required to receive the transfer of the first data and to reply a first process result obtained by executing the first process on the first data, to use the first estimated reply time to select an order destination to which the execution of the first process is to be ordered by the plurality of information processing apparatuses, and to order
(Continued)

the execution of the first process on the first data to the order destination via the communication interface unit.

14 Claims, 11 Drawing Sheets

(56) References Cited

U.S. PATENT DOCUMENTS

| | | | |
|---|---|---|---|
| 2012/0314608 A1* | 12/2012 | Okuno | H04L 67/10 |
| | | | 370/252 |
| 2013/0232184 A1* | 9/2013 | Grube | G06F 9/5066 |
| | | | 709/201 |
| 2019/0179693 A1* | 6/2019 | Kim | G06F 11/0772 |
| 2020/0057567 A1* | 2/2020 | Hutcheson | G06F 9/45558 |

FOREIGN PATENT DOCUMENTS

| | | |
|---|---|---|
| JP | 6-274608 A | 9/1994 |
| JP | 9-237193 A | 9/1997 |
| JP | 2017-16494 A | 1/2017 |
| JP | 2017-157136 A | 9/2017 |

OTHER PUBLICATIONS

Notice of Reasons for Refusal dated Oct. 8, 2019, received for JP Application 2019-541490, 8 pages including English Translation.

\* cited by examiner

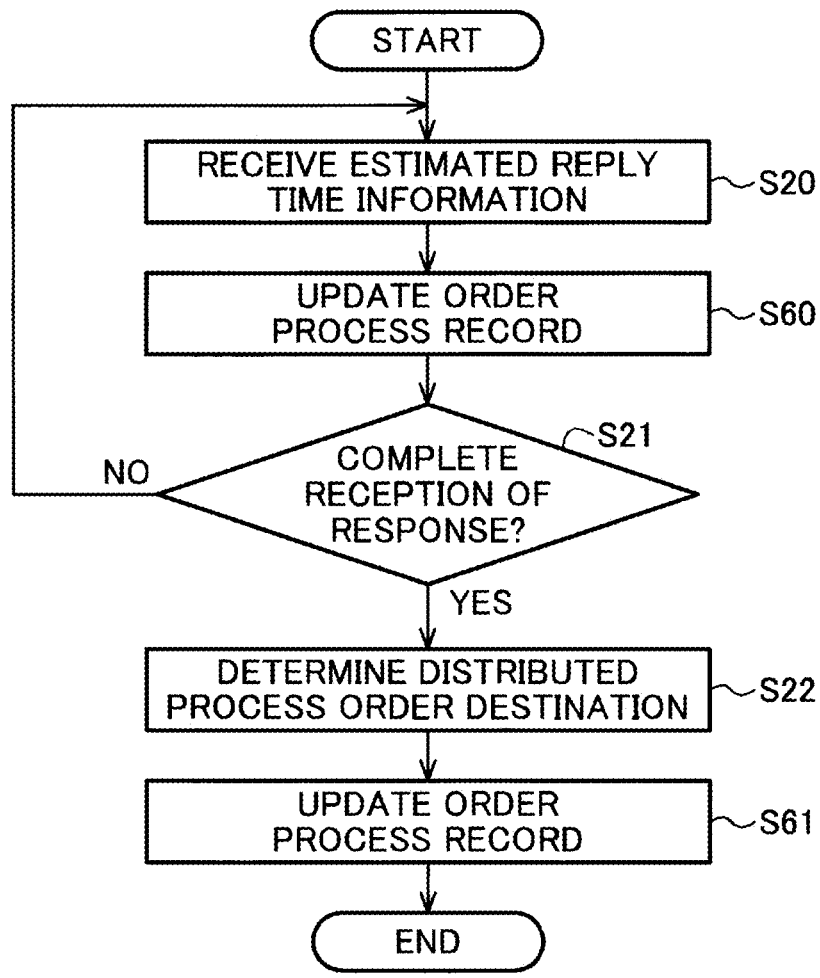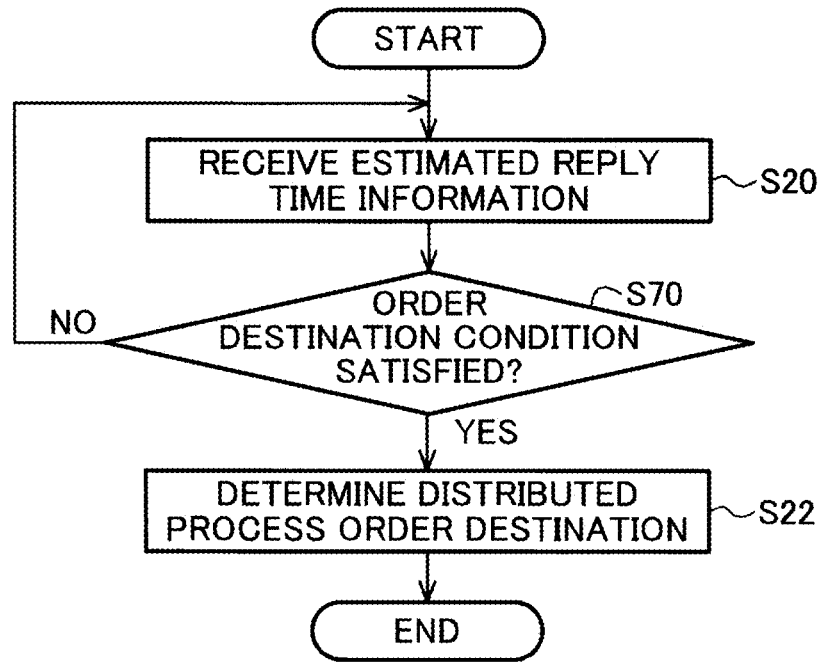

INFORMATION PROCESSING APPARATUS, INFORMATION PROCESSING SYSTEM, NON-TRANSITORY COMPUTER-READABLE MEDIUM, AND INFORMATION PROCESSING METHOD

CROSS-REFERENCE TO RELATED APPLICATION

The present application is based on PCT filing PCT/JP2019/003985, filed Feb. 5, 2019, the entire contents of which are incorporated herein by reference.

TECHNICAL FIELD

The present invention relates to an information processing apparatus, an information processing system, a program, and an information processing method.

BACKGROUND ART

Conventionally, advanced information process such as analysis process of images captured by a camera has been performed by a powerful information processing apparatus in a cloud. In recent years, in order to reduce network traffic and to avoid performance degradation due to communication delay, a distributed information processing system has been constructed by edge computing in which a simple and small information processing apparatus arranged near a signal input device such as a camera immediately processes information such as an input signal.

However, since the amount and contents of data input to each of the plurality of information processing apparatuses in the distributed information processing system are different, when the load of a specific information processing apparatus increases, the performance of the entire system decreases. For example, in the case of providing a service for detecting an area in which a specific person is present from video images captured by a plurality of cameras installed in a building in an in-building monitoring system, it is necessary to detect people from the video image captured by each camera and to perform an image analysis process for the detected area of each of the detected people. Therefore, an information processing apparatus connected to a camera in the vicinity of the entrance of a building where a large number of people are captured has a heavy load, thereby degrading the response performance of the entire system. On the other hand, an information processing apparatus connected to a camera installed in a place where few people pass, such as an emergency staircase, hardly executes the image analysis process for the person detection area, so that the process load is light, the idle state continues, and the computing resources are wasted.

Patent document 1 discloses technology in which, in order that an information processing apparatus equipped with a plurality of processors can use efficiently each processor to maximize the capability, a process distributing device is provided for deciding allocation of processes among the processors and allocates the processes to the processors in a distributed manner. This process distributing device estimates processing time for each process through the execution of the predetermined computing process before executing the allocation of the distributed process. The process distributing device then averages the process loads of the respective processors by assigning a new process to a processor with the minimum process load on the basis of the estimation result and the management table that records the allocated processor and the scale of each process.

PRIOR ART REFERENCE

Patent Reference

Patent Document 1: Japanese Unexamined Patent Application Publication No. H6-274608

SUMMARY OF THE INVENTION

Problem to be Solved by the Invention

In the conventional technology, the process is allocated to a device having a light process load on the basis of an estimated value of processing time for a predetermined operational process and a management table that records the scale of the allocated process and the information processing apparatus to which the process is allocated.

However, conventional technology does not consider the time required for obtaining the result of the process actually executed in a distributed manner. For example, in the conventional technology, since the transfer time of the data to be processed is not considered, even if the process is assigned to an information processing apparatus having a light process load, the response performance of the entire system decreases as the transfer time increases.

Therefore, an object of one or more aspects of the present invention is to accurately calculate the time until the process result is replied by considering the transfer time of the data to be processed in a distributed process in order to determine the optimum order destination of the distributed process.

Means of Solving the Problem

An information processing apparatus according to an aspect of the present invention is an information processing apparatus used as one of n information processing apparatuses (n is an integer greater than or equal to 2) in an information processing system that executes a process in a distributed manner with the n information processing apparatuses to be connected to a network, including: a communication interface unit to perform communication with the network; a request processing unit to send a first process distribution request to m information processing apparatuses (m is an integer satisfying $1 \leq m \leq n-1$) in the n information processing apparatuses via the communication interface unit, the first process distribution request being a request for ordering execution of a first process on first data; and an order destination selecting unit to receive, via the communication interface unit, as a response to the first process distribution request, a first estimated reply time calculated as a time required to receive the transfer of the first data and to reply a first process result obtained by executing the first process on the first data, to use the first estimated reply time to select an order destination to which the execution of the first process is to be ordered out of the n information processing apparatuses, and to order the execution of the first process on the first data to the order destination via the communication interface unit.

An information processing system according to an aspect of the present invention is an information processing system to execute a process in a distributed manner with n information processing apparatuses (n is an integer greater than or equal to 2) to be connected to a network, each of the n information processing apparatuses including: a communication interface unit to perform communication with the network; a request processing unit to send a first process distribution request to m information processing apparatuses (m is an integer satisfying $1 \leq m \leq n-1$) in the n information processing apparatuses via the communication interface unit, the first process distribution request being a request for ordering execution of a first process on first data; and an order destination selecting unit to receive, via the communication interface unit, as a response to the first process distribution request, a first estimated reply time calculated as a time required to receive the transfer of the first data and to reply a first process result obtained by executing the first process on the first data, to use the first estimated reply time to select an order destination to which the execution of the first process is to be ordered out of the n information processing apparatuses, and to order the execution of the first process on the first data to the order destination via the communication interface unit.

A program according to an aspect of the present invention is a program to cause a computer to function as an information processing apparatus of n information processing apparatuses (n is an integer greater than or equal to 2) in an information processing system to execute a process in a distributed manner with the n information processing apparatuses to be connected to a network, the program causing the computer to function as: a communication interface unit to perform communication with the network; a request processing unit to send a first process distribution request to m information processing apparatuses (m is an integer satisfying $1 \leq m \leq n-1$) in the n information processing apparatuses via the communication interface unit, the first process distribution request being a request for ordering execution of a first process on first data; and an order destination selecting unit to receive, via the communication interface unit, as a response to the first process distribution request, a first estimated reply time calculated as a time required to receive the transfer of the first data and to reply a first process result obtained by executing the first process on the first data, to use the first estimated reply time to select an order destination to which the execution of the first process is to be ordered out of the n information processing apparatuses, and to order the execution of the first process on the first data to the order destination via the communication interface unit.

An information processing method according to an aspect of the present invention is an information processing method to execute a process in a distributed manner with n information processing apparatuses (n is an integer greater than or equal to 2) to be connected to a network, the information processing method being performed by each of the n information processing apparatuses, the information processing method including: sending a first process distribution request to m information processing apparatuses (m is an integer satisfying $1 \leq m \leq n-1$) in the n information processing apparatuses, the first process distribution request being a request for ordering execution of a first process on the first data; receiving, as a response to the first process distribution request, a first estimated reply time calculated as a time required to receive the transfer of the first data and to reply a first process result obtained by executing the first process on the first data; using the first estimated reply time to select an order destination to which the execution of the first process is to be ordered out of the n information processing apparatuses; and ordering the execution of the first process on the first data to the order destination.

Effects of the Invention

According to one or more aspects of the present invention, in a distributed process, by considering the transfer time of data to be processed, it is possible to accurately calculate the time until the process result is replied and to determine the optimum order destination for a distributed process.

BRIEF DESCRIPTION OF THE DRAWINGS

FIG. 10 is a flowchart illustrating a process of selecting an order destination of a distributed process according to Embodiment 2.

FIG. 11 is a flowchart illustrating a process of selecting an order destination of a distributed process according to Embodiment 3.

MODE FOR CARRYING OUT THE INVENTION

Embodiment 1

Figure 1:
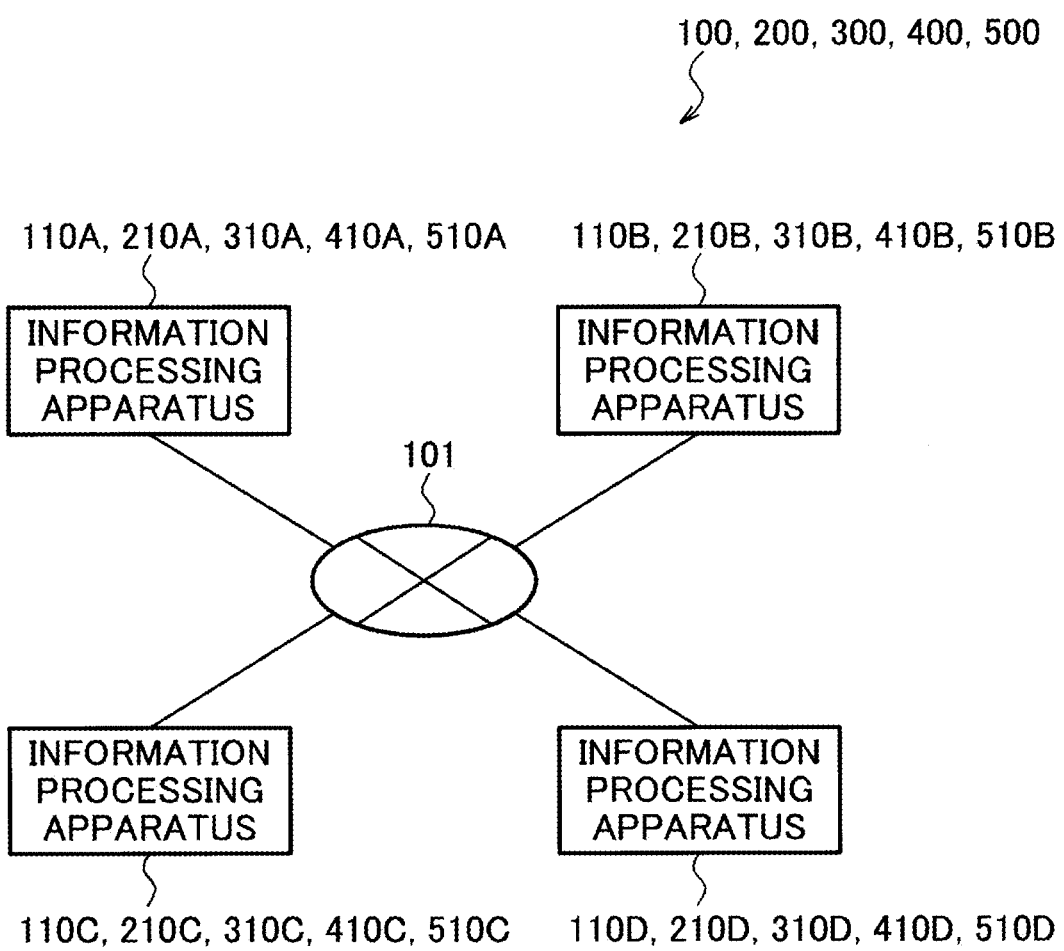
FIG. 1 is a block diagram schematically illustrating a configuration of a distributed information processing system according to Embodiments 1 to 5.

FIG. 1 is a block diagram schematically illustrating a configuration of a distributed information processing system 100 as an information processing system according to Embodiment 1.

The distributed information processing system 100 includes a plurality of information processing apparatuses 110A, 110B, 110C, and 110D. The plurality of information processing apparatuses 110A, 110B, 110C, and 110D are connected to a network 101.

Here, when it is not necessary to particularly distinguish each of the plurality of information processing apparatuses 110A, 110B, 110C, and 110D, each of them is referred to as the information processing apparatus 110.

The distributed information processing system 100 is a system that distributes processes among the plurality of information processing apparatuses 110A, 110B, 110C, and 110D to transmit and receive process results among them as necessary, thereby providing services in cooperation.

Note that, in FIG. 1, the distributed information processing system 100 includes four information processing apparatuses 110A, 110B, 110C, and 110D, but it is sufficient for the distributed information processing system 100 to include at least two information processing apparatuses 110. In other words, the distributed information processing system 100 includes n information processing apparatuses 110 (n is an integer greater than or equal to two).

Figure 2:
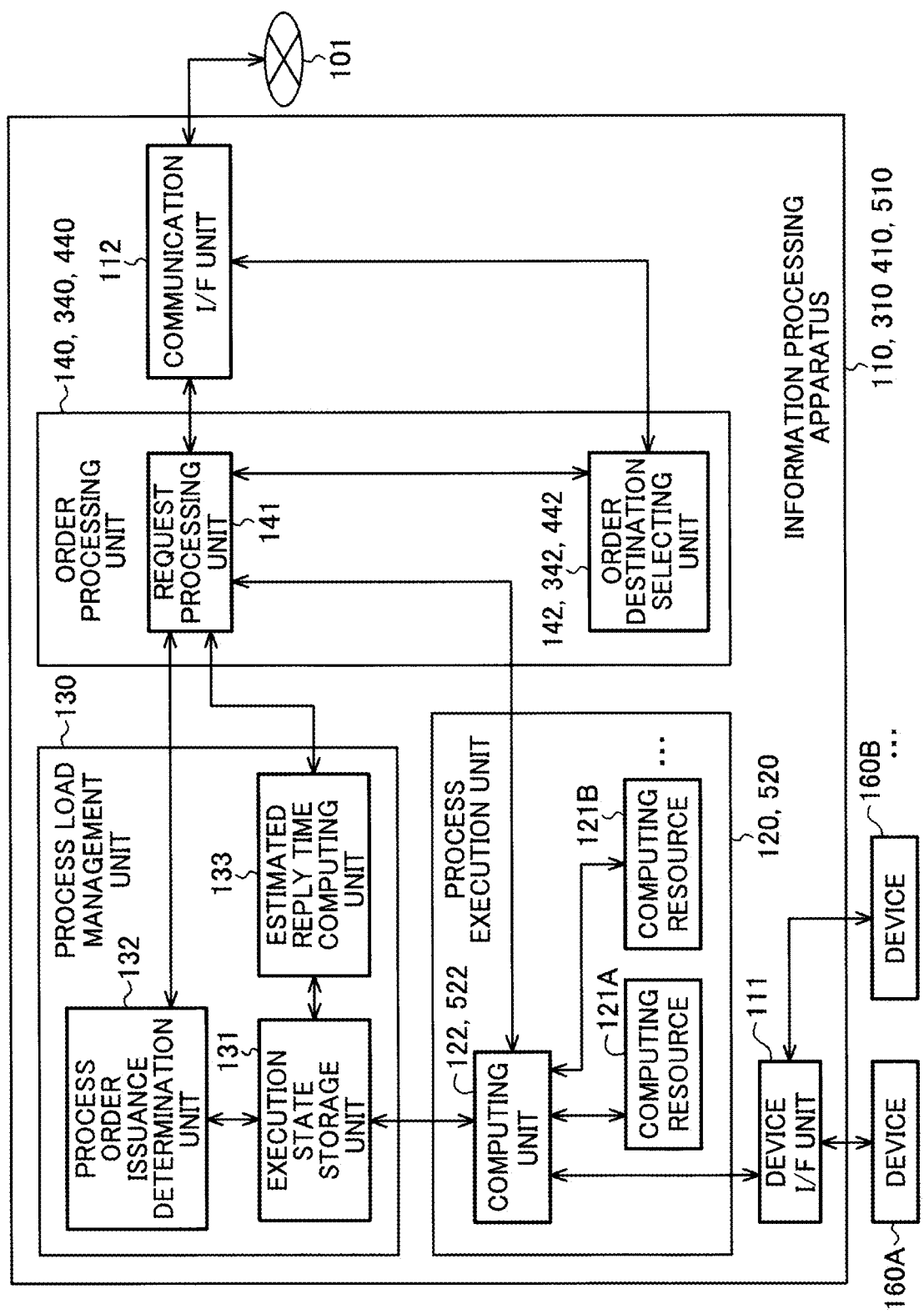
FIG. 2 is a block diagram schematically illustrating a configuration of information processing apparatuses according to Embodiments 1, 3, and 4.

FIG. 2 is a block diagram schematically illustrating a configuration of the information processing apparatus 110.

The information processing apparatus 110 includes a device interface unit (hereinafter referred to as the device I/F unit) 111, a communication interface unit (hereinafter referred to as the communication I/F unit) 112, a process execution unit 120, a process load management unit 130, and an order processing unit 140.

The device I/F unit 111 receives input of a signal to be processed by the process execution unit 120. The device I/F unit 111 is connected to another device 160 such as the device 160A, the device 160B, . . . , for example. The number of devices 160A, 160B, . . . connected to the device I/F unit 111 is not particularly limited. When it is not necessary to particularly distinguish each of the devices 160A, 160B, . . . connected to the device I/F unit 111, each of them is referred to as the device 160. The device I/F unit 111 receives input of a signal from the device 160. The device 160 may be, for example, a camera, illuminometer, or another sensor.

The communication I/F unit 112 communicates with the network 101.

The process execution unit 120 executes processes. For example, the process execution unit 120 executes a process on the data indicated by the signal input to the device I/F unit 111. In addition, the process execution unit 120 executes the process ordered by another information processing apparatus 110 on the basis of the distributed process execution instruction from the order processing unit 140.

The process execution unit 120 includes computing resources 121A, 121B, . . . , and a computing unit 122.

The number of the computing resources 121A, 121B, . . . provided in the process execution unit 120 may be one or more. When it is not necessary to particularly distinguish each of the computing resources 121A, 121B, . . . , each of them is referred to as the computing resource 121.

The computing resource 121 executes computing processes. For example, the computing resource 121 can be implemented by an integrated circuit such as a CPU (Central Processing Unit) or a GPU (Graphics Processing Unit).

The computing unit 122 allocates computing processes to one or more computing resources 121 according to the contents of the computing process to be executed by the process execution unit 120.

Further, at the time of executing the computing process, the computing unit 122 notifies the process load management unit 130 of process execution state information indicating the process execution state, such as the usage rate of the computing resource 121 or the number of process waiting tasks. The process execution state indicates a process load.

The process load management unit 130 manages the process load of the process execution unit 120.

The process load management unit 130 includes an execution state storage unit 131, a process order issuance determination unit 132, and an estimated reply time computing unit 133.

The execution state storage unit 131 stores process execution state information provided by the process execution unit 120.

When the process load of the process execution unit 120 reaches or exceeds a predetermined threshold value, the process order issuance determination unit 132 determines that the process is to be executed in a distributed manner. For example, the process order issuance determination unit 132 determines, on the basis of the process execution state indicated by the process execution state information stored in the execution state storage unit 131, whether to issue, to the other information processing apparatuses 110, a process distribution request, which is a request to execute the process in a distributed manner. When it is determined that the issue of the process distribution request to the other information processing apparatuses 110 is necessary, the process order issuance determination unit 132 supplies a request instruction for instructing the issue of the process distribution request to the order processing unit 140.

Upon receiving a process distribution request from another information processing apparatus 110 from the order processing unit 140, the estimated reply time computing unit 133 calculates, on the basis of the process execution state information stored in the execution state storage unit 131, a time required to receive the transfer of the data to be processed from the request source of the process distribution request via the communication I/F unit 112 and to reply a process result obtained by executing the ordered process for the data, and supplies the estimated reply time information indicating the calculated estimated reply time to the order processing unit 140. In other words, the estimated reply time computing unit 133 calculates the estimated reply time by considering the data transfer time. Note that the data transfer time may be determined in advance in accordance with the data amount, for example, by transferring predetermined data between the information processing apparatuses 110 in advance and measuring the transfer time in accordance with the data amount from the result. Further, by adding the sending time point to the process distribution request by the sending-side information processing apparatus 110, the transfer time may be determined in accordance with the data amount from the difference between the sending time point and the receiving time point at which the process distribution request is received.

The order processing unit 140 processes a request instruction from the process load management unit 130, a distributed process execution order to another information processing apparatus 110, and a process distribution request and a distributed process execution order from another information processing apparatus 110.

The order processing unit 140 includes a request processing unit 141 and an order destination selecting unit 142.

Upon receiving a request instruction from the process load management unit 130, the request processing unit 141 causes the communication I/F unit 112 to transmit a process distribution request to the other information processing apparatuses 110. The process distribution request includes, for example, information indicating process data amount, which is the amount of data to be processed, in addition to the type and number of tasks of the process to be ordered to the other information processing apparatuses 110. Here, the process distribution request sent from the own apparatus to the other information processing apparatus 110 is also referred to as a first process distribution request, and the first process distribution request is a request for ordering the execution of the first process on the first data. Further, as will be described later, when the process order issuance determination unit 132 determines that it is undesirable to distribute the process to the other information processing apparatuses 110, the process is performed by the own apparatus, and the process performed by the own apparatus is also included in the first process on the first data.

In Embodiment 1, it is assumed that the request processing unit 141 causes the communication I/F unit 112 to transmit the process distribution request to all the other information processing apparatuses 110. For example, when the distributed information processing system 100 includes n information processing apparatuses 110 (n is an integer greater than or equal to 2), the request processing unit 141 sends the process distribution request to m information processing apparatuses 110 (m is an integer satisfying m=n−1) other than the own apparatus.

When receiving a process distribution request from another information processing apparatus 110 through the communication I/F unit 112, the request processing unit 141 supplies the process distribution request to the estimated reply time computing unit 133. Upon receiving the estimated reply time information from the estimated reply time computing unit 133, the request processing unit 141 causes the communication I/F unit 112 to transmit the estimated reply time information to the request source of the process distribution request, thereby responding to the request. Here, the process distribution request from the other information processing apparatus 110 is also referred to as the second process distribution request, and the second process distribution request is a request for ordering the execution of the second process on the second data.

In response to the second process distribution request, the estimated reply time calculated by the estimated reply time computing unit 133 is also referred to as the second estimated reply time, and the estimated reply time information indicating the second estimated reply time is also referred to as the second estimated reply time information.

Further, when receiving the estimated reply time information from another information processing apparatus 110 through the communication I/F unit 112, the request processing unit 141 supplies the estimated reply time information to the order destination selecting unit 142. The estimated reply time information from the other information processing apparatus 110 is also referred to as the first estimated reply time information, and the estimated reply time indicated by the first estimated reply time information is also referred to as the first estimated reply time.

When receiving a distributed process execution order from another information processing apparatus 110 through the communication I/F unit 112, the request processing unit 141 supplies a corresponding distributed process execution instruction to the computing unit 122 on the basis of the distributed process execution order. Then, the request processing unit 141 causes the communication I/F unit 112 to transmit the process result of the computing unit 122 to the information processing apparatus 110 that is the sender of the distributed process execution order. Here, the distributed process execution order from the other information processing apparatus 110 is also referred to as a second distributed process execution order, and the second distributed process execution order is an order for the execution of the second process on the second data. The process result obtained by executing the second process on the second data is also referred to as the second process result.

The order destination selecting unit 142 uses the estimated reply time indicated by the estimated reply time information from the other information processing apparatus 110 to select an information processing apparatus 110 for ordering the execution of the process. Then, the order destination selecting unit 142 causes the communication I/F unit 112 to transmit the distributed process execution order to the selected information processing apparatus 110. Here, the distributed process execution order sent from the own apparatus to the other information processing apparatus 110 is also referred to as a first distributed process execution order, and the first distributed process execution order is an order for the execution of the first process on the first data. The process result obtained by executing the first process on the first data is also referred to as the first process result. Further, as will be described later, when the process order issuance determination unit 132 determines that it is undesirable to distribute the process to the other information processing apparatus 110, the process is performed by the own apparatus, and the process performed by the own apparatus is also included in the first process on the first data.

When a process is distributed to other information processing apparatuses 110 in the distributed information processing system 100, it is necessary to transmit data to be processed together with the distributed process execution order. Therefore, even if the execution time of the process is short, in a case where the transfer of the data to be processed takes a long time, the time from the reception of the distributed process execution order to the reply of the process result becomes long. In such a case, the reply can be obtained faster by performing the process by the own apparatus after completing the other current process than by distributing the process to the other information processing apparatuses 110. In other words, in such a case, there is a risk that the system performance is degraded due to the wasteful distributed process and the network traffic is congested due to the data transfer for the distributed process, thereby impairing the advantage of edge computing.

However, as in Embodiment 1, by providing the information processing apparatus 110 with the estimated reply time computing unit 133, calculating the estimated time until the reply by considering the time required for the transfer of the data to be processed in response to the process distribution request, and selecting the distributed process order destination on the basis of the estimated reply time information from each information processing apparatus 110, it is possible to suppress wasteful distributed processes and to select the information processing apparatus 110 from which the reply to the distributed process order can be acquired in the fastest time. This improves the overall response performance of the distributed information processing system 100. Also, even if a specific information processing apparatus 110 fails, it is possible to select an appropriate distributed process order destination.

Figure 3A:
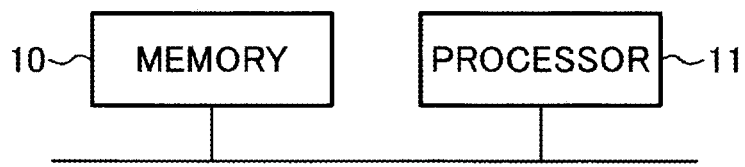
FIGS. 3A and 3B are block diagrams illustrating an example hardware configuration.

As shown in FIG. 3A, for example, the information processing apparatus 110 described above can be implemented by a computer including a memory 10 and a processor 11 such as a CPU (Central Processing Unit) that executes programs stored in the memory 10.

For example, the process execution unit 120; the process order issuance determination unit 132 and the estimated reply time computing unit 133 of the process load management unit 130; and the order processing unit 140 can be implemented by the processor 11, and the execution state storage unit 131 of the process load management unit 130 can be implemented by the memory 10. A plurality of processors 11 may be provided.

Such a program may be provided over a network or may be recorded on a recording medium. That is, such a program may be provided, for example, as a program product.

Figure 3B:
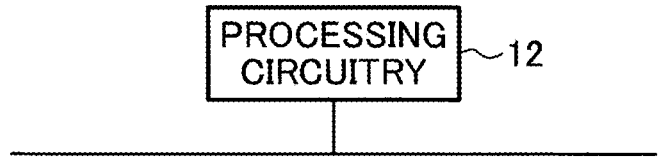

Further, as shown in FIG. 3B, part or all of the information processing apparatus 110 may be implemented by a processing circuit 12 such as a single circuit, a composite circuit, a programmed processor, a parallel programmed processor, an ASIC (Application Specific Integrated Circuits) or an FPGA (Field Programmable Gate Array).

In other words, part or all of the information processing apparatus 110 may be implemented by processing circuitry.

The device I/F unit 111 can be implemented by a connection interface such as USB (Universal Serial Bus).

The communication I/F unit 112 can be implemented by a communication interface such as NIC (Network Interface Card).

Next, an operation performed by the information processing apparatus 110 according to Embodiment 1 will be described.

Figure 4:
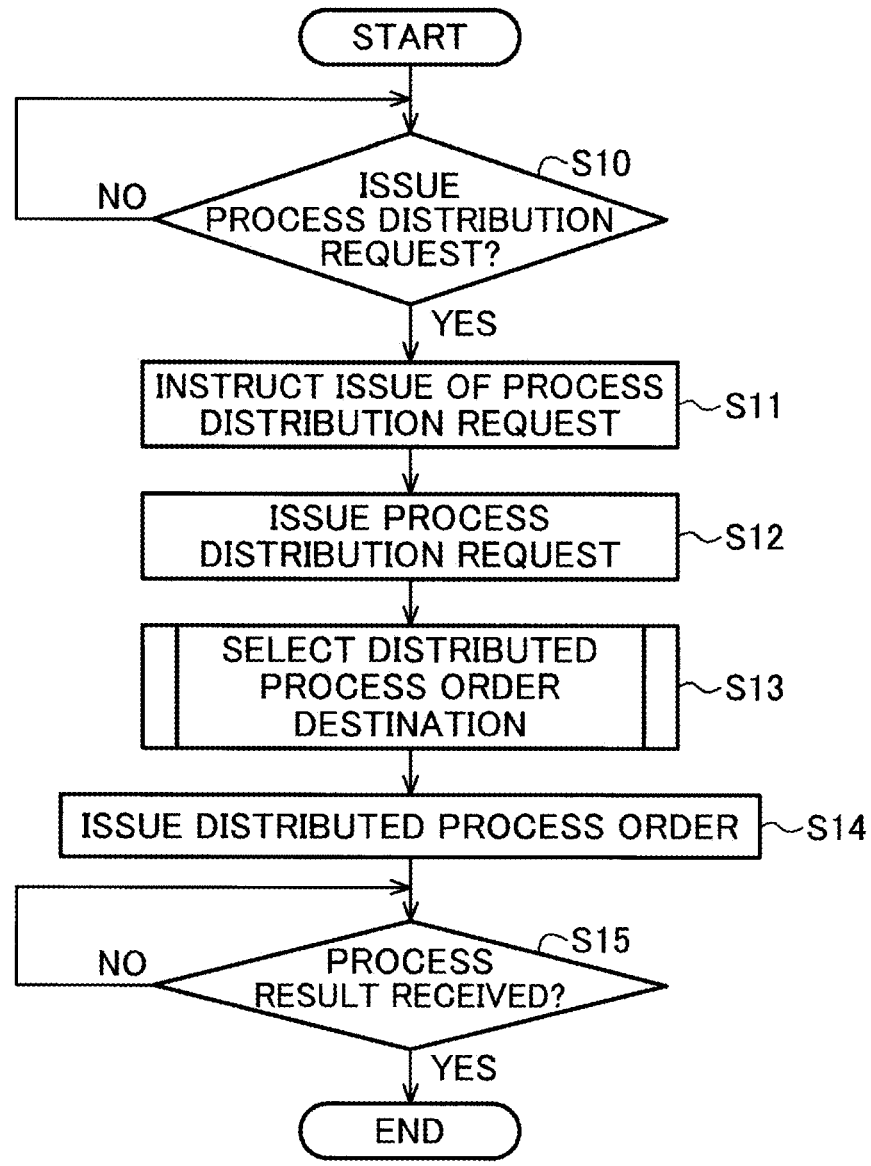
FIG. 4 is a flowchart illustrating an operation of an information processing apparatus according to Embodiment 1 to execute a process in a distributed manner.

FIG. 4 is a flowchart illustrating an operation when the information processing apparatus 110 according to Embodiment 1 executes a process in a distributed manner.

The process order issuance determination unit 132 of the information processing apparatus 110 monitors the process load of the own apparatus and determines whether to distribute a process to another information processing apparatus 110 (S10). The process order issuance determination unit 132 can determine whether to perform a process in a distributed manner, for example, on the basis of the condition that the usage rate of the computing resource 121 of the own apparatus or the number of tasks waiting for processing reaches or exceeds a predetermined value, the condition that the response speed of the own apparatus falls below a predetermined value, or the condition that the response speed of the own apparatus slows down at a certain rate or more comparing to the initial rate. The response speed corresponds to, for example, a frame rate indicating how many captured images can be analyzed per second in the case of image analysis process for camera images.

Note that the process order issuance determination unit 132 determines whether to distribute the process according to the contents of the process or the amount of data to be processed. For a process undesirable to distribute to the other information processing apparatus 110, the process order issuance determination unit 132 determines that the process is to be executed by the own apparatus. For example, the processes not to be distributed may be predetermined according to the respective types of the processes.

If it is determined that the process is to be performed in a distributed manner, the process proceeds to step S11.

In step S11, the process order issuance determination unit 132 supplies, to the request processing unit 141, a request instruction to issue a process distribution request.

In response to this request instruction, the request processing unit 141 issues a process distribution request via the communication I/F unit 112 to all the other information processing apparatuses 110 included in the distributed information processing system 100 (S12).

Next, the order destination selecting unit 142 waits for the reply of the estimated reply time information from each information processing apparatus 110 and performs a process of selecting the order destination of the distributed process (S13). The process here will be described with reference to FIG. 5.

When the order destination of the distributed process is determined in step S13, the order destination selecting unit 142 issues a distributed process execution order via the communication I/F unit 112 to the information processing apparatus 110 selected as the order destination (S14).

After issuing the distributed process execution order, the information processing apparatus 110 being the issuing source waits for the reception of the process result from the information processing apparatus 110 being the issuing destination (S15). When the process result is received, the received process result is supplied to the request processing unit 141.

Figure 5:
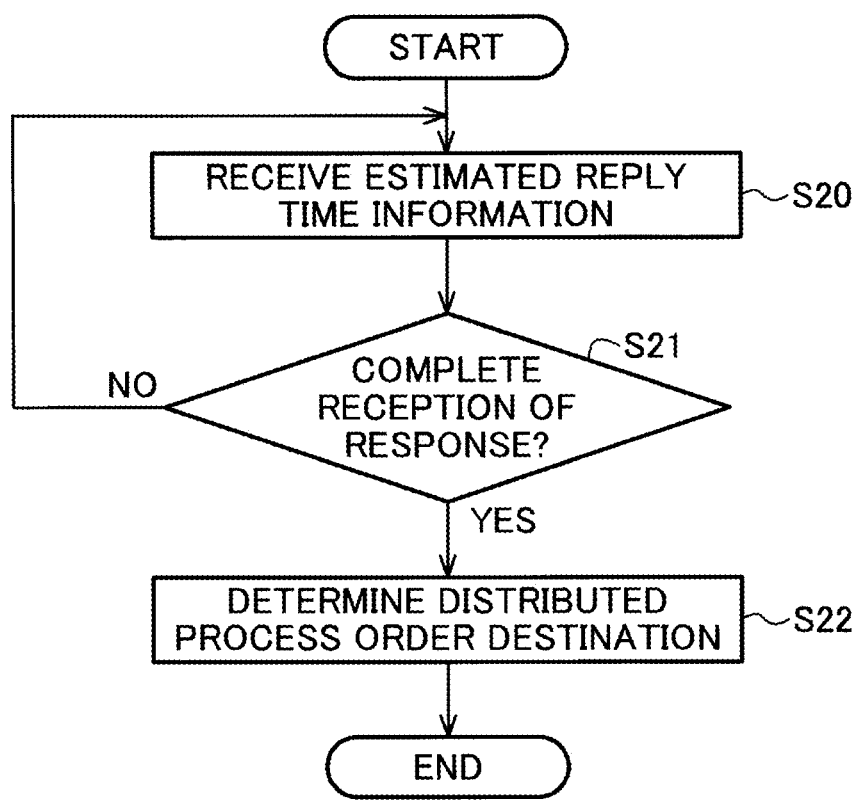
FIG. 5 is a flowchart illustrating a process of selecting an order destination of a distributed process according to Embodiment 1.

FIG. 5 is a flowchart illustrating a process of selecting an order destination of a distributed process according to Embodiment 1.

The order destination selecting unit 142 receives, via the communication I/F unit 112, estimated reply time information from the other information processing apparatus 110 (S20). The received estimated reply time information is temporarily stored in a storage unit not shown, for example.

Then, the order destination selecting unit 142 waits for a response from the other information processing apparatus 110 until a condition for response reception completion determination is satisfied (S21). The condition for the response reception completion determination is, for example, whether or not a response has been received from a certain number or more of the information processing apparatuses 110, or whether or not a certain period of time has elapsed since the process distribution request was issued. This response reception completion determination can eliminate wasteful response reception waiting time that occurs when a specific information processing apparatus 110 cannot respond due to a failure or the like.

When the condition for the response reception completion determination is satisfied (Yes in S21), the process proceeds to step S22.

In step S22, the order destination selecting unit 142 compares the estimated reply times indicated by the estimated reply time information received from the other information processing apparatuses 110 to select an order destination of the distributed process. For example, the order destination selecting unit 142 selects the information processing apparatus 110 that has responded with the shortest estimated reply time as the order destination. However, when the shortest estimated reply time is longer than the predetermined threshold time, the order destination selecting unit 142 selects the own apparatus as the order destination.

Figure 6:
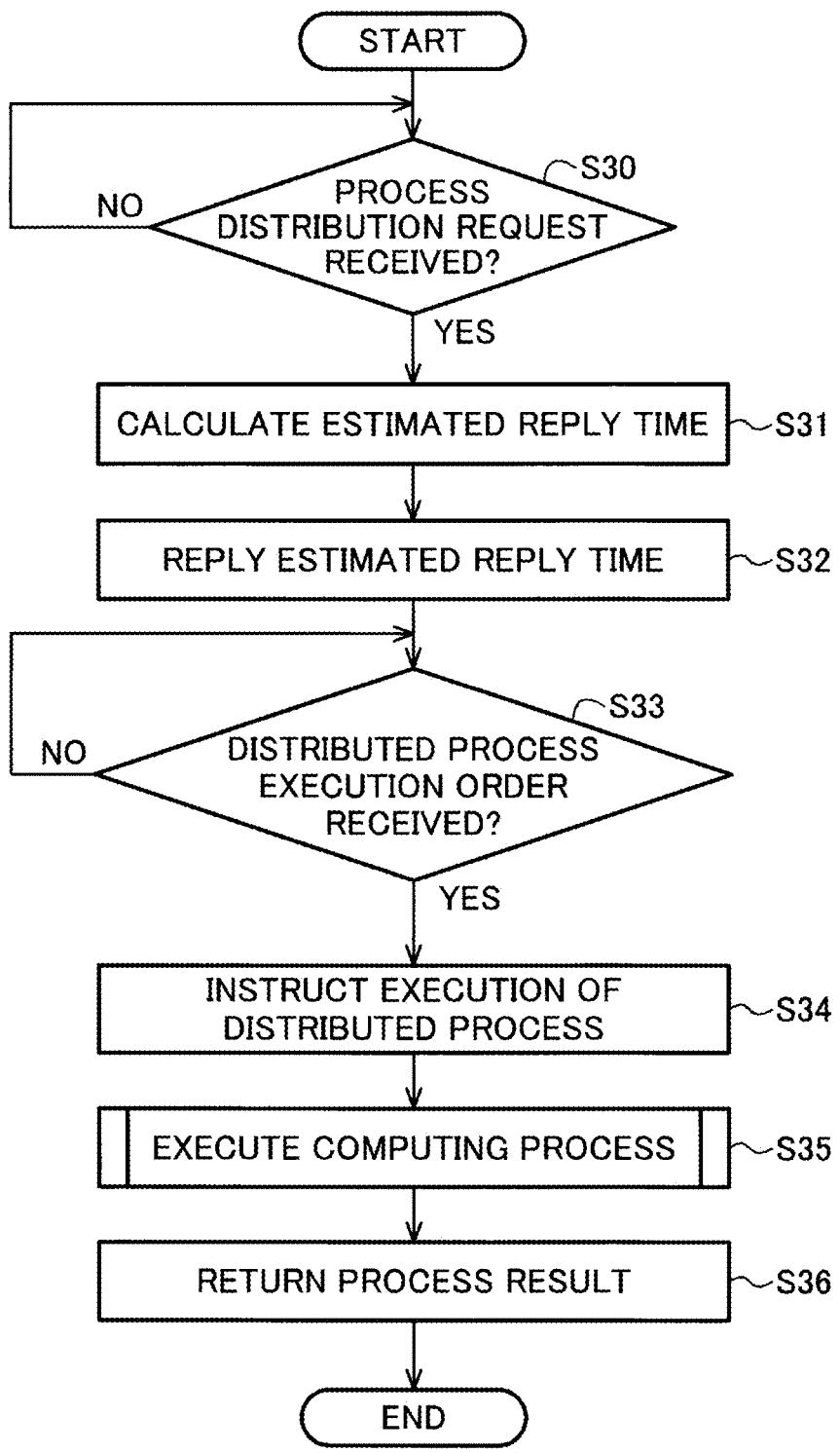
FIG. 6 is a flowchart illustrating an operation of the information processing apparatus when a process distribution request and a distributed process execution order are received.

FIG. 6 is a flowchart illustrating an operation of the information processing apparatus 110 when the process distribution request and the distributed process execution order are received.

The request processing unit 141 determines whether or not a process distribution request has been received, via the communication I/F unit 112, from another information processing apparatus 110 (S30). If a process distribution request is received (Yes in S30), the process proceeds to step S31.

In step S31, the estimated reply time computing unit 133 calculates the estimated reply time required to respond to the process requested in the received process distribution request. The estimated reply time is the time required to receive the data to be processed and to reply the process result and is estimated from the type of tasks, the number of tasks, the amount of data to be processed indicated in the process distribution request, and the load status of the own apparatus. As described above, by considering the transfer time of the data to be processed in the calculation of the estimated reply time, the time required when the distributed process is executed by each information processing apparatus 110 can be accurately calculated, so that the information processing apparatus 110 capable of improving the response performance of the entire system can be appropriately selected as an order destination of a distributed process.

Further, when the estimated reply time is long since the amount of the data to be processed is large, the order source of the distributed process can select to process the data by the own apparatus, thereby avoiding an unnecessary distributed process and the congestion of the network traffic due to the transfer of data for the unnecessary distributed process.

Then, the request processing unit 141 sends, via the communication I/F unit 112, estimated reply time information indicating the estimated reply time calculated by the estimated reply time computing unit 133 to the request source of the process distribution request (S32).

If the request processing unit 141 cannot accept a distributed process execution order from another information processing apparatus 110 due to a high load of the own apparatus or the like, the request processing unit 141 can send request unacceptability information as the response to the process distribution request in order to save unnecessary effort for calculating the estimated reply time.

If the request processing unit 141 receives a distributed process execution order via the communication I/F unit 112 after responding to the process distribution request with the estimated reply time (Yes in S33), the process proceeds to step S34.

In step S34, the request processing unit 141 sends a distributed process execution instruction to the computing unit 122.

Upon receiving the distributed process execution instruction, the computing unit 122 executes the process ordered by another information processing apparatus 110 on the basis of the distributed process execution instruction (S35). The process here will be described with reference to FIG. 7.

Upon receiving the process result for the distributed process execution instruction from the computing unit 122, the request processing unit 141 sends the process result to the order source of the distributed process execution order via the communication I/F unit 112 (S36).

Figure 7:
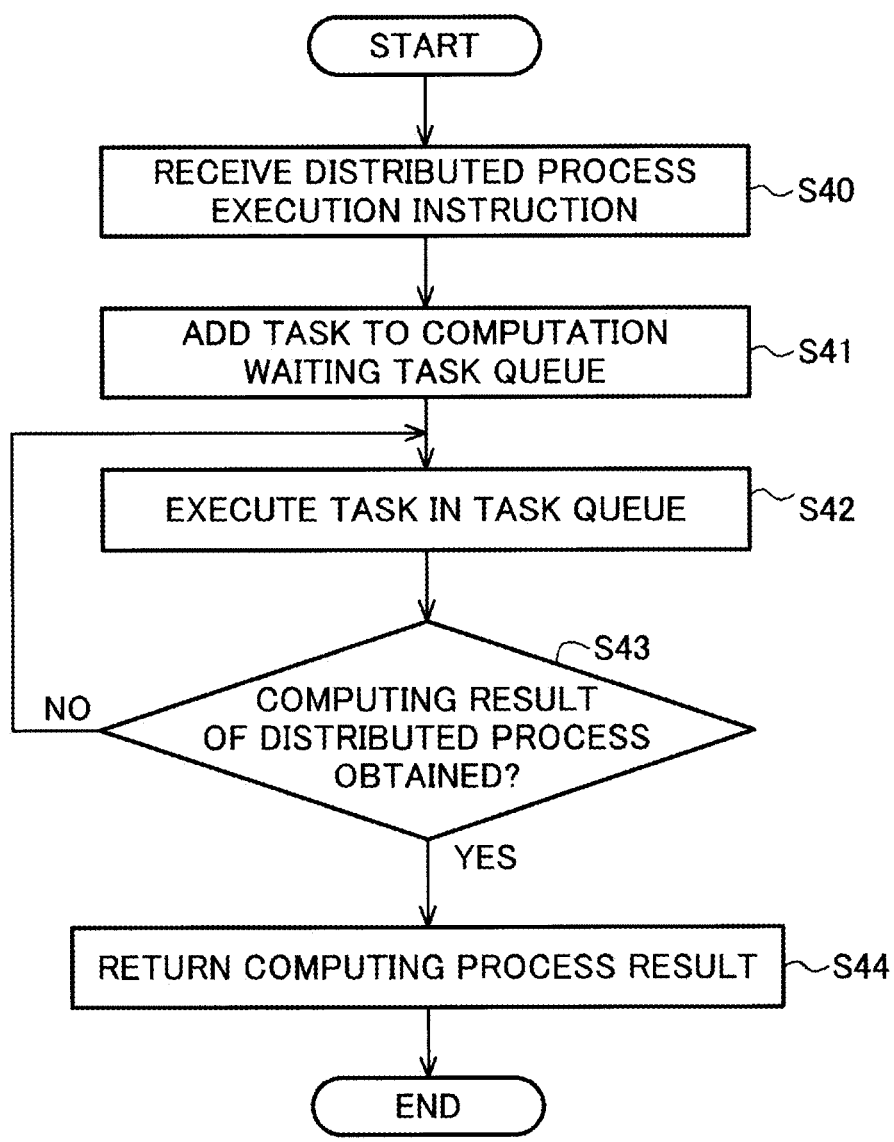
FIG. 7 is a flowchart illustrating an operation to execute a process ordered by another information processing apparatus according to Embodiment 1.

FIG. 7 is a flowchart illustrating an operation to execute process ordered by another information processing apparatus 110.

The computing unit 122 receives the distributed process execution instruction from the request processing unit 141 (S40).

The computing unit 122 adds the task indicated by the distributed process execution instruction to the computation waiting task queue (S41).

The computing unit 122 allocates the computing resources 121 to the tasks included in the task queue and sequentially executes the tasks (S42).

Then, the computing unit 122 determines whether or not the process result for the distributed process execution instruction has been acquired (S43). If the process result for the distributed process execution instruction has been acquired (Yes in S43), the process proceeds to step S44.

In step S44, the computing unit 122 supplies the acquired process result to the request processing unit 141. When executing the distributed process from the other information processing apparatus 110, the computing unit 122 supplies process execution state information indicating the process execution state to the process load management unit 130 as required in the same manner as in normal cases.

As described above, according to Embodiment 1, it is possible to improve the responsive process performance of the entire system by suppressing unnecessary process distribution in the distributed information processing system 100 and by effectively utilizing the computing resources of the information processing apparatus 110 in the system without wastefully increasing the communication load in the system.

Although the processes are described respectively with regard to the sender and the receiver of the process distribution request and the distributed process execution order in the above description, any information processing apparatus 110 in the system can be a sender that sends a request for the distributed process to another information processing apparatus 110, or a receiver that receives a request for the distributed process from another information processing apparatus 110.

Embodiment 2

As shown in FIG. 1, a distributed information processing system 200 as an information processing system according to Embodiment 2 includes a plurality of information processing apparatuses 210A, 210B, 210C, and 210D. The plurality of information processing apparatuses 210A, 210B, 210C, and 210D are connected to a network 101.

Here, when it is not necessary to particularly distinguish each of the plurality of information processing apparatuses 210A, 210B, 210C, and 210D, each of them is referred to as the information processing apparatus 210.

Figure 8:
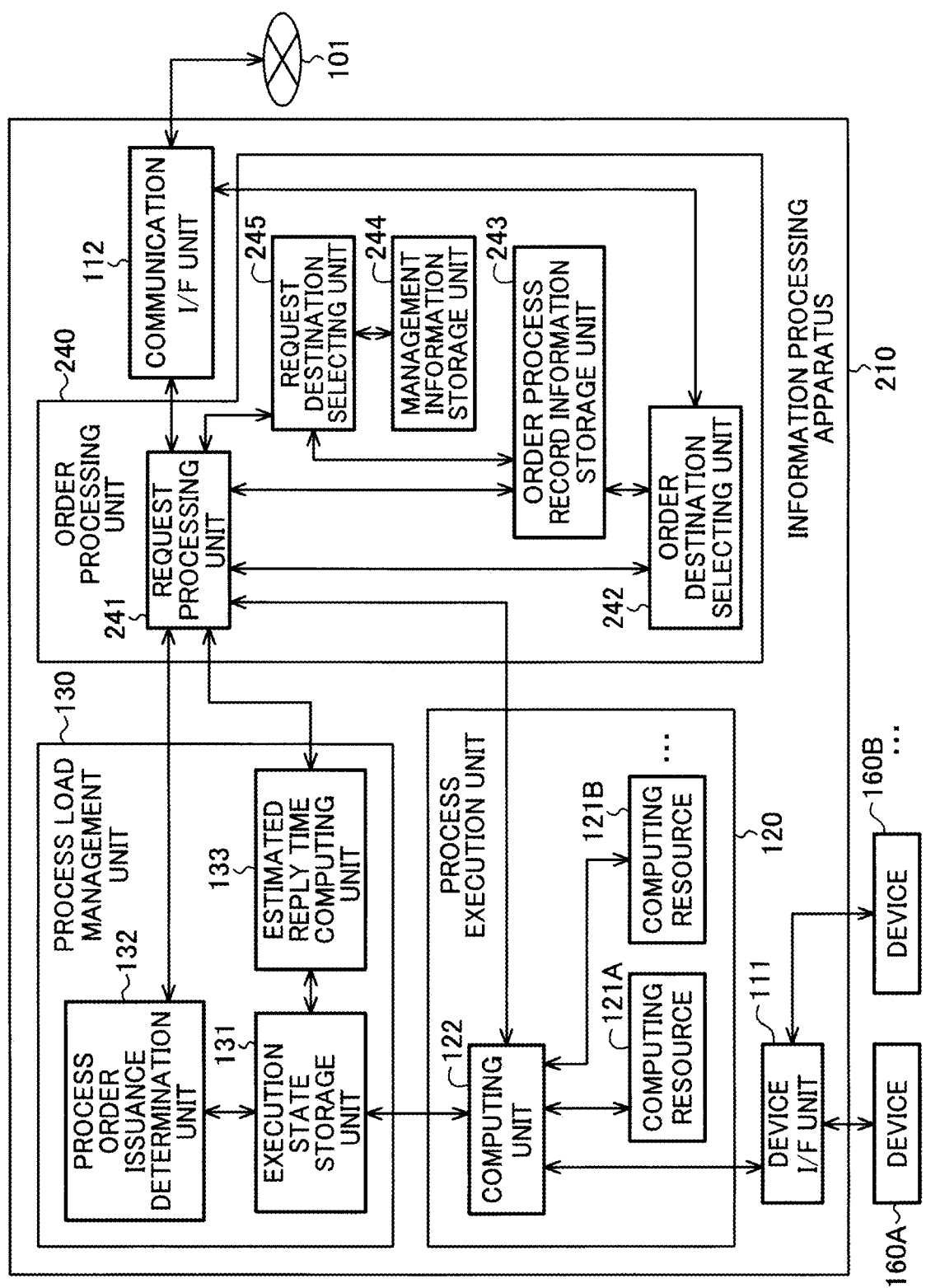
FIG. 8 is a block diagram schematically illustrating a configuration of an information processing apparatus according to Embodiment 2.

FIG. 8 is a block diagram schematically illustrating a configuration of the information processing apparatus 210 according to Embodiment 2.

The information processing apparatus 210 according to Embodiment 2 includes a device I/F unit 111, a communication I/F unit 112, a process execution unit 120, a process load management unit 130, and an order processing unit 240.

The device I/F unit 111, the communication I/F unit 112, the process execution unit 120, and the process load management unit 130 of the information processing apparatus 210 in Embodiment 2 are the same as the device I/F unit 111, the communication I/F unit 112, the process execution unit 120, and the process load management unit 130 of the information processing apparatus 110 in Embodiment 1.

The order processing unit 240 processes a request instruction from the process load management unit 130, a distributed process execution order to another information processing apparatus 210, and a process distribution request and a distributed process execution order from another information processing apparatus 210.

The order processing unit 240 includes a request processing unit 241, an order destination selecting unit 242, an order process record information storage unit 243, a management information storage unit 244, and a request destination selecting unit 245.

Upon receiving a request instruction from the process load management unit 130, the request processing unit 241 issues a process distribution request destination selection command to the request destination selecting unit 245 to select a destination of the process distribution request.

Then, upon the selection of the information processing apparatus 210 by the request destination selecting unit 245, the request processing unit 241 causes the communication I/F unit 112 to transmit a process distribution request to the selected information processing apparatus 210.

The other processes of the request processing unit 241 in Embodiment 2 are the same as those of the request processing unit 141 in Embodiment 1.

The order process record information storage unit 243 stores order process record information relating to record of distributed processes with the other information processing apparatuses 110. For example, the order process record information includes; with regard to past process distribution requests, for each of the information processing apparatuses 210, information indicating the estimated reply time, whether or not the request unacceptability information has been received, and whether or not a reply has been received; and with regard to past distributed process execution orders, for each of the information processing apparatuses 210, information indicating the reply time of the process result and whether or not the process result has been replied.

Thus, by storing the order process record information, it is possible to select an appropriate candidate without knowing the specifications of the respective information processing apparatuses 210 in advance, and even when a specific information processing apparatus 210 fails or the number or types of information processing apparatuses 210 constituting the distributed information processing system 200 change, it is possible to select a distributed process order destination from appropriate information processing apparatuses 210 without issuing a wasteful process distribution request.

The management information storage unit 244 stores management information including information indicating attributes such as the type, number, or performance of the computing resources 121 held by each information processing apparatus 210, and information such as whether or not a process execution order can be accepted from another information processing apparatus 210.

As for the management information, in addition to storing the specifications of the respective information processing apparatuses 210 collectively in advance, it is also possible to periodically perform communication among the information processing apparatuses 210 to exchange and update the information.

Upon receiving the process distribution request destination selection command, the request destination selecting unit 245 refers to the management information stored in the management information storage unit 244 and the order process record information stored in the order process record information storage unit 243 to select an information processing apparatus 210 to which the process distribution request is to be transmitted, or in other words, an information processing apparatus 210 suitable for executing the process to be ordered. The selection result is supplied to the request processing unit 241, and as described above, the request processing unit 241 issues a process distribution request only to the selected information processing apparatuses 210. For example, in a case where the distributed information processing system 200 includes n information processing apparatuses 210 (n is an integer greater than or equal to 2), the request processing unit 241 sends the process distribution request to m information processing apparatuses 210 (m is an integer satisfying 1≤m≤n−1) determined to be suitable.

For example, the request destination selecting unit 245 refers to the conditions established for each process such as the type, number, or performance of the computing resources 121 required for the process execution and to the management information to exclude, from the selection, the information processing apparatuses 210 not satisfying the conditions required for the process execution.

Further, the request destination selecting unit 245 excludes, from the selection, the information processing apparatuses 210 that cannot accept the distributed process from the other information processing apparatus 210 by referring to the management information.

Further, the request destination selecting unit 245 calculates an average value of the estimated reply time for each information processing apparatus 210 by referring to the order process record information, and excludes, from the selection, the information processing apparatus 210 whose average value is longer than a predetermined threshold value.

In addition, by referring to the order process record information, the request destination selecting unit 245 regards the information processing apparatus 210 whose most recent estimated reply time is long as having a heavy load, and excludes such information processing apparatus 210 from the selection.

Further, by referring to the order process record information, the request destination selecting unit 245 considers that the information processing apparatus 210, which has not responded to the process distribution request or the distributed process execution order for a certain period or most recently, has failed or has been removed from the network 101, and excludes such information processing apparatus 210 from the selection.

The request destination selecting unit 245 may select the information processing apparatuses 210 other than the information processing apparatuses 210 judged to be excluded as described above.

The order destination selecting unit 242 uses the estimated reply time indicated by the estimated reply time information from the other information processing apparatuses 210 to select an information processing apparatus 210 for ordering the execution of processing. Then, the order destination selecting unit 242 causes the communication I/F unit 112 to transmit a distributed process execution order to the selected information processing apparatus 210.

The order destination selecting unit 242 stores necessary information in the order process record information stored in the order process record information storage unit 243 according to the response status of the other information processing apparatuses 210 with regard to the process distribution request.

Furthermore, the order destination selecting unit 242 stores necessary information in the order process record information, which will be described later, stored in the order process record information storage unit 243, according to the response status of the other information processing apparatuses 210 with regard to the distributed process execution order.

The request processing unit 241, the order destination selecting unit 242, and the request destination selecting unit 245 of the order processing unit 240 described above can also be implemented by the processor 11 shown in FIG. 3A, for example, and the order process record information storage unit 243 and the management information storage unit 244 of the order processing unit 240 can be implemented by the memory 10.

Further, a part or all of the request processing unit 241, the order destination selecting unit 242, and the request destination selecting unit 245 of the order processing unit 240 may be implemented by the processing circuit 12 shown in FIG. 3B, for example.

Figure 9:
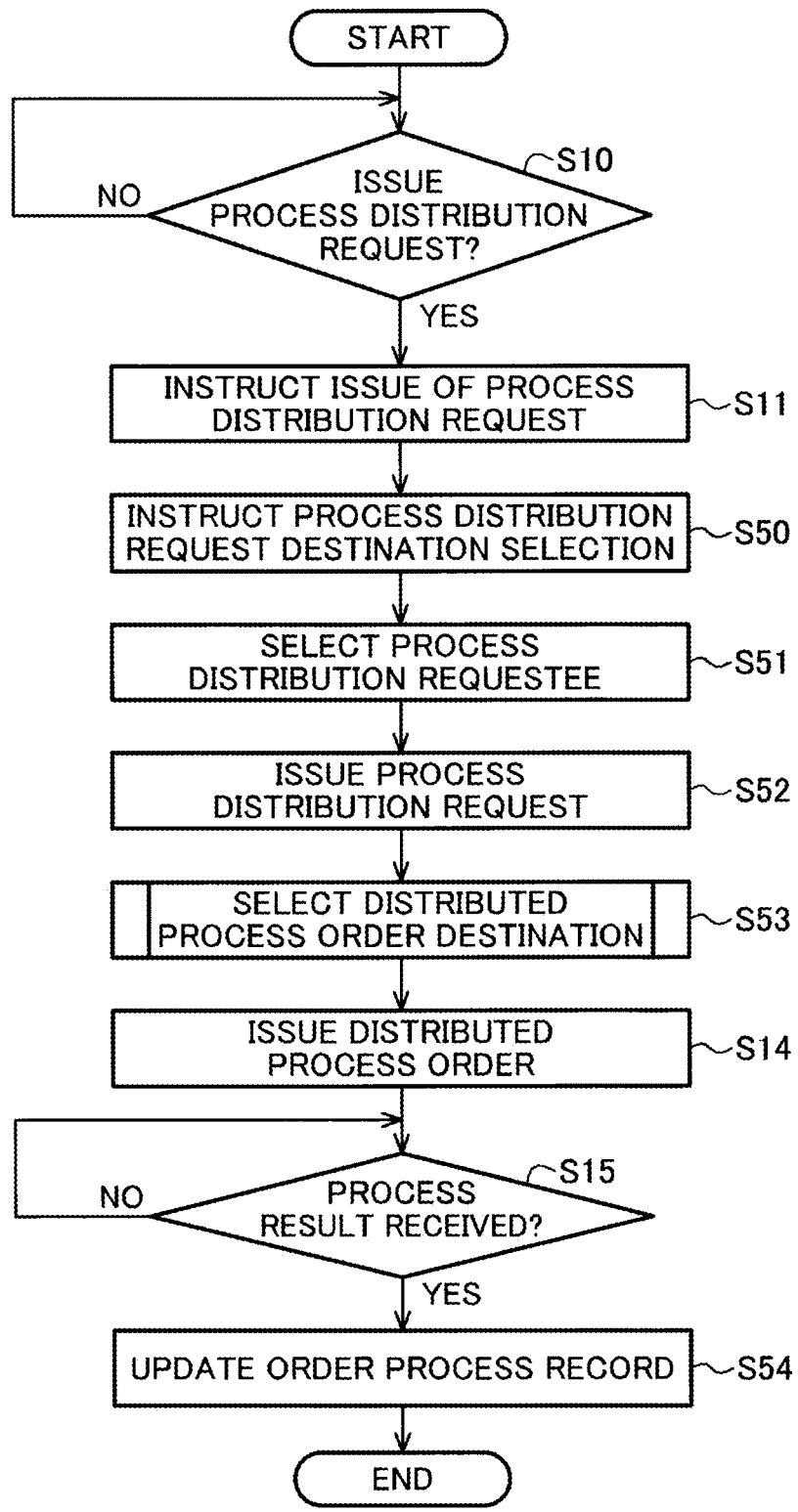
FIG. 9 is a flowchart illustrating an operation of an information processing apparatus according to Embodiment 2 to execute a process in a distributed manner.

FIG. 9 is a flowchart illustrating an operation of the information processing apparatus 210 according to Embodiment 2 to execute a process in a distributed manner.

Among the steps included in the flowchart shown in FIG. 9, the steps similar to the steps included in the flowchart shown in FIG. 4 are denoted by the same reference numerals as those in FIG. 4, and the description thereof will be omitted.

Steps S10 and S11 in FIG. 9 are similar to steps S10 and S11 in FIG. 4. However, after step S11 in FIG. 9, the process proceeds to step S50.

In step S50, upon receiving a request instruction to issue a process distribution request from the process order issuance determination unit 132, the request processing unit 241 issues the process distribution request destination selection command to the request destination selecting unit 245.

Upon receiving the process distribution request destination selection command, the request destination selecting unit 245 refers to the management information stored in the management information storage unit 244 and the order process record information stored in the order process record information storage unit 243 to select the information processing apparatus 210 to which the process distribution request is to be transmitted (S51). Then, the request destination selecting unit 245 notifies the request processing unit 241 of the selected information processing apparatus 210.

The request processing unit 241 issues a process distribution request via the communication I/F unit 112 to the selected information processing apparatuses 210 (S52).

Next, the order destination selecting unit 242 waits for the reply of the estimated reply time information from the selected information processing apparatus 210, and performs a process of selecting an order destination of a distributed process (S53). The process here will be described with reference to FIG. 10. Then, the process proceeds to step S14.

Steps 14 and 15 in FIG. 9 are similar to steps 14 and 15 in FIG. 4. However, in step S15 of FIG. 9, when the process result is received (Yes in S15), the process proceeds to step S54.

In step S54, the order destination selecting unit 242 updates the order process record information stored in the order process record information storage unit 243 on the basis of the response status of the information processing apparatus 210 with regard to the distributed process execution order. For example, the order destination selecting unit 242 stores information indicating the presence or absence of the reply and the reply time of the process result received from the information processing apparatus 210 in the order process record information.

FIG. 10 is a flowchart illustrating a process of selecting an order destination of a distributed process according to Embodiment 2.

Among the steps included in the flowchart shown in FIG. 10, the steps similar to the steps included in the flowchart shown in FIG. 5 are denoted by the same reference numerals as those in FIG. 5, and the description thereof will be omitted.

Step S10 shown in FIG. 20 is similar to step S20 shown in FIG. 5. However, after step S20, the process proceeds to step S60.

In step S60, the order destination selecting unit 242 updates the order process record information stored in the order process record information storage unit 243 on the basis of the response status of the information processing apparatus 210 with regard to the process distribution request. Here, for example, the order destination selecting unit 242 stores, in the order process record information, the estimated reply time received from the information processing apparatus 210 and information indicating that a response has been made in response to the process distribution request.

Then, the process proceeds to step S21.

Steps S21 and S22 in FIG. 10 are similar to steps S21 and S22 in FIG. 5.

However, after the process in step S22, the process proceeds to step S61.

In step S61, the order destination selecting unit 242 updates the order process record information stored in the order process record information storage unit 243 as necessary on the basis of the response status of the information processing apparatus 210 with regard to the process distribution request. For example, when receiving request unacceptability information from an information processing apparatus 210 in response to the process distribution request, the order destination selecting unit 242 stores this fact in the order process record information. Furthermore, when there is an information processing apparatus 210 which does not respond to the process distribution request, the order destination selecting unit 242 stores information indicating the lack of the response in the order process record information.

As described above, according to Embodiment 2, by limiting the information processing apparatuses 210 to which the process distribution request is issued to appropriate ones by the request destination selecting unit 245, it is possible to reduce wasteful communication, wasteful reply estimation time calculation process in each information processing apparatus 210, and wasteful response waiting time for the process distribution request.

In Embodiment 2 described above, the request destination selecting unit 245 uses both the management information stored in the management information storage unit 244 and the order process record information stored in the order process record information storage unit 243 to select the information processing apparatuses 210 to which the process distribution request is issued, but Embodiment 2 is not limited to such an example.

For example, the request destination selecting unit 245 may refer only to the management information or the order process record information to select the information processing apparatuses 210 to which the process distribution request is issued.

In step S60 of FIG. 10, the order process record information is updated every time the estimated reply time information is received, but Embodiment 2 is not limited to such an example. For example, the order destination selecting unit 242 may temporarily store the estimated reply time information in a storage unit (not shown), and collectively update the order process record information in step S61, for example. In this case, process distribution requests may be grouped according to the task type and the order process record information may be updated for process distribution requests of the same task type.

Further, in step S22 of FIG. 10, as in Embodiment 1, the information processing apparatus 220 which has responded with the shortest estimated reply time is selected as the order destination, but Embodiment 2 is not limited to such an example.

For example, the order destination selecting unit 242 may select an order destination by referring to at least one of the management information or the order process record information.

Specifically, when there are information processing apparatuses that have responded with estimated reply time information indicating an estimated reply time within a predetermined time from the shortest estimated reply time, the order destination selecting unit 242 refers to the order process record information to select, as the order destination, the information processing apparatus 210 that has responded to the distributed process execution order the largest number of times among the information processing apparatus that has responded with estimated reply time information indicating the shortest estimated reply time and the information processing apparatuses that have responded with estimated reply time information indicating the estimated reply time within the predetermined time from the shortest estimated reply time. In this way, if the estimated reply times are the same to some extent, the difference is regarded as being within error margin, thereby reducing the risk of missing a response to the distributed process. For example, it is possible to exclude an information processing apparatus 210, which has the resources necessary for the calculation, but is often unable to respond because the connection to the network 101 is unstable.

Further, when there are information processing apparatuses that have responded with estimated reply time information indicating an estimated reply time within a predetermined time from the shortest estimated reply time, the order destination selecting unit 242 refers to the management information to select, as the order destination, the information processing apparatus 210 that has the largest number of computing resources 121 suited to the process to be ordered. Thus, it is possible to select the information processing apparatus 210 from which the process result can be acquired quickly at a higher accuracy.

Embodiment 3

As shown in FIG. 1, a distributed information processing system 300 as an information processing system according to Embodiment 3 includes a plurality of information processing apparatuses 310A, 310B, 310C, and 310D. The plurality of information processing apparatuses 310A, 310B, 310C, and 310D are connected to a network 101.

Here, when it is not necessary to particularly distinguish each of the plurality of information processing apparatuses 310A, 310B, 310C, and 310D, each of them is referred to as the information processing apparatus 310.

As shown in FIG. 2, the information processing apparatus 310 according to Embodiment 3 includes a device I/F unit 111, a communication I/F unit 112, a process execution unit 120, a process load management unit 130, and an order processing unit 340.

The device I/F unit 111, the communication I/F unit 112, the process execution unit 120, and the process load management unit 130 of the information processing apparatus 310 in Embodiment 3 are similar to the device I/F unit 111, the communication I/F unit 112, the process execution unit 120, and the process load management unit 130 of the information processing apparatus 110 in Embodiment 1.

The order processing unit 340 processes a request instruction from the process load management unit 130, a distributed process execution order to another information processing apparatus 310, and a process distribution request and a distributed process execution order from another information processing apparatus 310.

The order processing unit 340 includes a request processing unit 141 and an order destination selecting unit 342.

The request processing unit 141 of the order processing unit 340 in Embodiment 3, is the same as the request processing unit 141 of the order processing unit 140 in Embodiment 1.

The order destination selecting unit 342 in Embodiment 3, differs from the order destination selecting unit 142 in Embodiment 1 in the condition for the response reception completion determination but other processes are the same as those of the order destination selecting unit 142 in Embodiment 1. This will be described with reference to FIG. 11.

FIG. 11 is a flowchart illustrating a process of selecting an order destination of a distributed process according to Embodiment 3.

Among the steps included in the flowchart shown in FIG. 11, the steps similar to the steps included in the flowchart shown in FIG. 5 are denoted by the same reference numerals as those in FIG. 5, and the description thereof will be omitted.

Step S20 shown in FIG. 11 is similar to step S20 shown in FIG. 5. However, after step S20, the process proceeds to step S70.

In step S70, the order destination selecting unit 342 waits for a response from the other information processing apparatus 310 until the condition for the response reception completion determination is satisfied. The condition for the response reception completion determination is that, for example, the estimated reply time indicated by the estimated reply time information from the information processing apparatus 310 satisfies an order destination condition which is a predetermined threshold. In other words, when an estimated reply time shorter than the predetermined time is acquired, it is determined that the condition for the response reception completion determination is satisfied. If the condition for the response reception completion determination is satisfied (Yes in S70), the process proceeds to step S22.

Step S22 shown in FIG. 11 is similar to step S22 shown in FIG. 5.

In step S70, if the estimated reply times from all the information processing apparatuses 310 to which the process distribution requests have been sent do not satisfy the order destination condition, the order destination selecting unit 342 assumes that the order destination condition for the response reception completion determination is satisfied, and proceeds to step S22. Then, the order destination selecting unit 342 may select the own apparatus as the order destination in step S22.

As described above, according to Embodiment 3, by setting the condition for the response reception completion determination as the acquirement of the estimated reply time satisfying the order destination condition, the extra response waiting time can be reduced and the appropriate information processing apparatus 310 can be selected as the distributed process order destination. In other words, in Embodiment 3, since the information processing apparatus 310 that responds first the estimated reply time satisfying the order destination condition is selected as the order destination, the order destination can be quickly and appropriately selected.

The threshold value as the order destination condition is not limited to the predetermined time, and for example, the order destination selecting unit 342 may calculate a time period for satisfying the system response performance requirement using a predetermined function or the like, and the calculated time period may be used as the order destination condition.

In addition, the order destination selecting unit 342 may set the estimated reply time of the own apparatus as the order destination condition. Thus, the information processing apparatus 310 capable of acquiring the process result faster than processing by the own apparatus can be selected as the order destination of the distributed process.

Further, the order destination selecting unit 342 may receive a response from each of the information processing apparatuses 310 during a predetermined reception waiting time, and may further extend the reception waiting time when the estimated reply times received during the predetermined reception waiting time do not satisfy the order destination condition.

Embodiment 4

As shown in FIG. 1, a distributed information processing system 400 as an information processing system according to Embodiment 4 includes a plurality of information processing apparatuses 410A, 410B, 410C, and 410D. The plurality of information processing apparatuses 410A, 410B, 410C, and 410D are connected to a network 101.

Here, when it is not necessary to particularly distinguish each of the plurality of information processing apparatuses 410A, 410B, 410C, and 410D, each of them is referred to as the information processing apparatus 410.

As shown in FIG. 2, the information processing apparatus 410 according to Embodiment 4 includes a device I/F unit 111, a communication I/F unit 112, a process execution unit 120, a process load management unit 130, and an order processing unit 440.

The device I/F unit 111, the communication I/F unit 112, the process execution unit 120, and the process load management unit 130 of the information processing apparatus 410 in Embodiment 4 are the same as the device I/F unit 111, the communication I/F unit 112, the process execution unit 120, and the process load management unit 130 of the information processing apparatus 110 in Embodiment 1.

The order processing unit 440 processes a request instruction from the process load management unit 130, a distributed process execution order to another information processing apparatus 410, and a process distribution request and a distributed process execution order from another information processing apparatus 410.

The order processing unit 440 includes a request processing unit 141 and an order destination selecting unit 442.

The request processing unit 141 of the order processing unit 440 in Embodiment 4 is the same as the request processing unit 141 of the order processing unit 140 in Embodiment 1.

In Embodiment 4, the order destination selecting unit 442 uses the estimated reply time indicated by the estimated reply time information from the other information processing apparatus 410 to select the information processing apparatus 410 to be ordered for the execution of the process. Then, the order destination selecting unit 442 causes the communication I/F unit 112 to transmit a distributed process execution order to the selected information processing apparatus 410.

Note that the order destination selecting unit 442 in Embodiment 4 differs from the order destination selecting unit 142 in Embodiment 1 in the process of selecting an order destination of distributed process and acquiring a process result from the order destination. This will be described with reference to FIG. 12.

Figure 12:
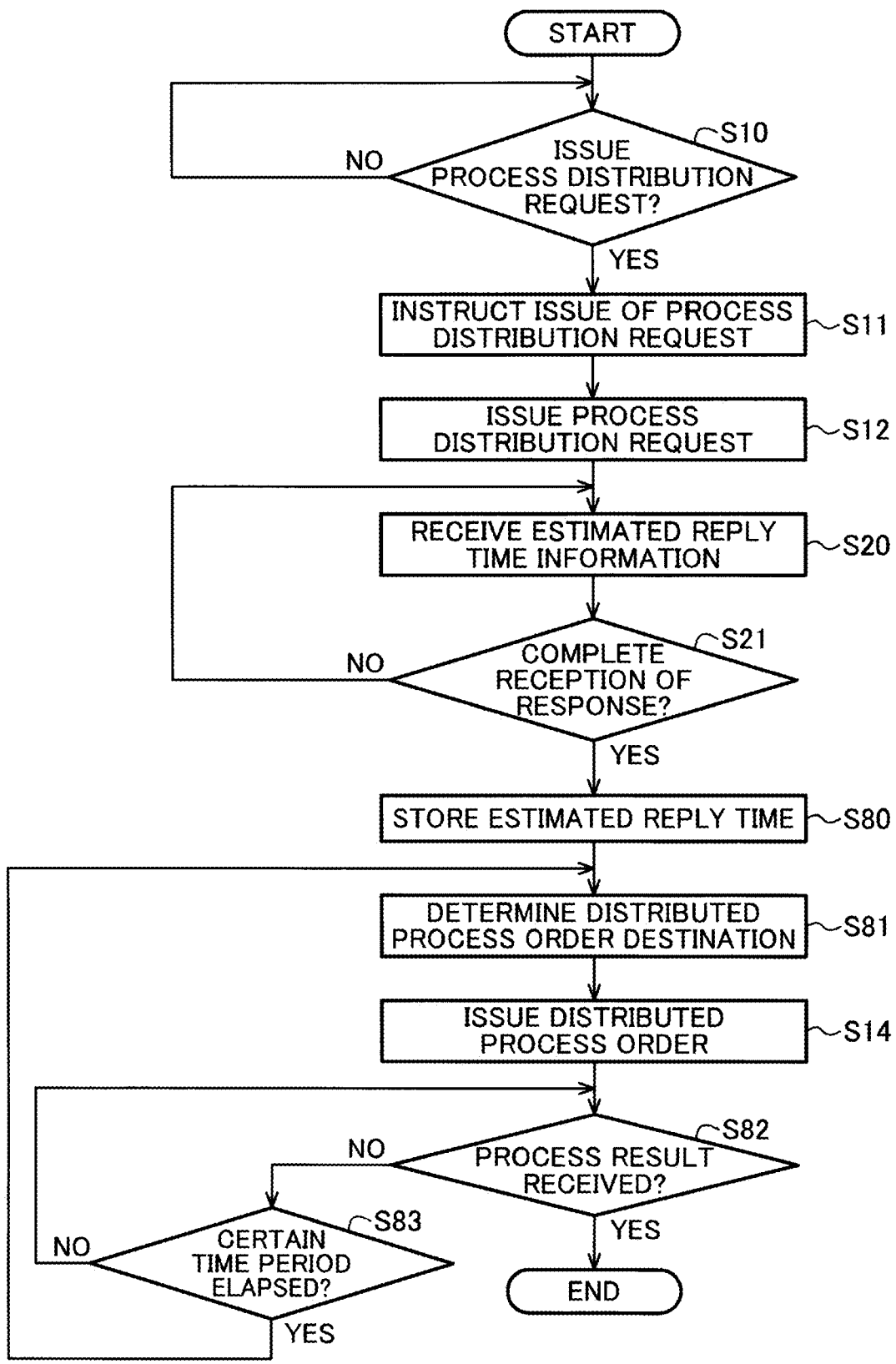
FIG. 12 is a flowchart illustrating an operation of an information processing apparatus according to Embodiment 4 to execute a process in a distributed manner.

FIG. 12 is a flowchart illustrating an operation of the information processing apparatus 410 according to Embodiment 4 to execute a process in a distributed manner.

Among the steps included in the flowchart shown in FIG. 12, the steps similar to the steps included in the flowchart shown in FIG. 4 or 5 are denoted by the same reference numerals as those in FIG. 4 or 5, and the description thereof will be omitted.

Steps 10 to 12 shown in FIG. 12 are similar to the steps 10 to 12 shown in FIG. 4. However, in FIG. 12, after step S12, the process proceeds to step S20.

Also, steps S20 and S21 shown in FIG. 12 are similar to steps S20 and S21 shown in FIG. 5. However, in FIG. 12, after step S21, the process proceeds to step S80.

In step S80, the order destination selecting unit 442 temporarily stores the estimated reply time indicated by received estimated reply time information in a storage unit not shown.

Next, the order destination selecting unit 442 compares the estimated reply times stored in the storage unit not shown to select, from among the information processing apparatuses 410 not yet selected, the information processing apparatus 410 which has responded with the shortest estimated reply time as the order destination (S81). Then, the process proceeds to step S14.

Step S14 shown in FIG. 12 is similar to step S14 shown in FIG. 4. However, in FIG. 12, after step S14, the process proceeds to step S82.

In step S82, the order destination selecting unit 442 determines whether or not the process result has been received from the information processing apparatus 410 to which the distributed process execution order is issued. If the process result is received (Yes in S82), the process ends, and if the process result is not received (No in S82), the process proceeds to step S83.

In step S83, the order destination selecting unit 442 determines whether or not a predetermined period has elapsed since the distributed process execution order was issued. If the predetermined period has not elapsed (No in S83), the process returns to step S82, and if the predetermined period has elapsed (Yes in S83), the process returns to step S81. In step S81, an information processing apparatus 410 different from the currently selected information processing apparatus 410, in this case, the information processing apparatus 410 having the next shortest estimated reply time after the currently selected information processing apparatus 410 is reselected. The other information processing apparatus 410 reselected here may be the own apparatus. For example, if the estimated reply time which is the next shortest after the estimated reply time of the currently selected information processing apparatus 410 is longer than a predetermined threshold time, the order destination selecting unit 442 selects the own apparatus.

As described above, according to Embodiment 4, by setting a time limit for the reception of the process result from the order destination of the distributed process, and ordering the distributed process to the next information processing apparatus 410 if the process result is not received within the set time, it is possible to prevent the process from being stopped due to the failure of the ordered information processing apparatus 410 after the order of the distributed process, for example.

In step S21 in FIG. 12, as in the case of Embodiment 3, the condition for the response reception completion determination may be that the estimated reply time satisfies the order destination condition which is a predetermined threshold value.

Embodiment 5

As shown in FIG. 1, a distributed information processing system 500 as an information processing system according to Embodiment 5 includes a plurality of information processing apparatuses 510A, 510B, 510C, and 510D. The plurality of information processing apparatuses 510A, 510B, 510C, and 510D are connected to a network 101.

Here, when it is not necessary to particularly distinguish each of the plurality of information processing apparatuses 510A, 510B, 510C, and 510D, each of them is referred to as an information processing apparatus 510.

As shown in FIG. 2, the information processing apparatus 510 according to Embodiment 5 includes a device I/F unit 111, a communication I/F unit 112, a process execution unit 520, a process load management unit 130, and an order processing unit 140.

The device I/F unit 111, the communication I/F unit 112, the process load management unit 130, and the order processing unit 140 of the information processing apparatus 510 in Embodiment 5 are the same as the device I/F unit 111, the communication I/F unit 112, the process load management unit 130, and the order processing unit 140 of the information processing apparatus 110 in Embodiment 1.

The process execution unit 520 includes a computing resource 121 and a computing unit 522.

The computing resource 121 of the process execution unit 520 in Embodiment 5 is the same as the computing resource 121 of the process execution unit 120 in Embodiment 1.

The computing unit 522 is different from the computing unit 122 in Embodiment 1 in the way of executing a process. This will be described with reference to FIG. 13.

Figure 13:
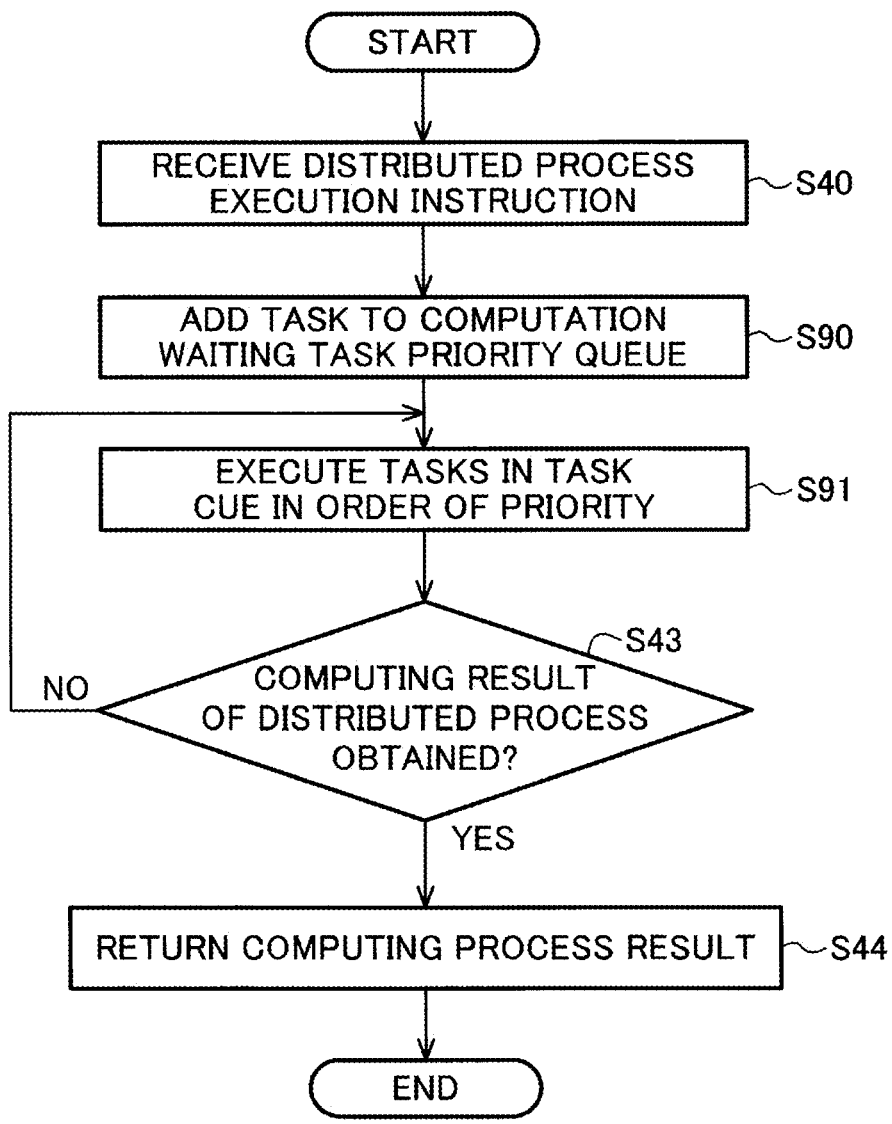
FIG. 13 is a flowchart illustrating an operation to execute a process ordered by another information processing apparatus according to Embodiment 5.

FIG. 13 is a flowchart illustrating an operation to execute a process ordered by another information processing apparatus 510.

Among the steps included in the flowchart shown in FIG. 13, the steps similar to the steps included in the flowchart shown in FIG. 7 are denoted by the same reference numerals as those in FIG. 7, and the description thereof will be omitted.

Step S40 shown in FIG. 13 is similar to step S40 shown in FIG. 7. However, in FIG. 13, after step S40, the process proceeds to step S90.

In step S90, the computing unit 522 assigns a priority to the task indicated by the distributed process execution instruction, and adds the task with the assigned priority to a computation waiting task priority queue.

Here, it is assumed that the priority assigned to the task is set for each information processing apparatus 510. For example, with respect to an information processing apparatus 510 connected to a camera installed at an important place such as a building entrance in a camera monitoring system in a building, the process of the important information processing apparatus 510 can be executed with priority by being assigned a high priority.

Further, as the generation time of the data to be processed is older, a higher priority may be assigned. Thus, a higher priority for execution can be assigned to a process having a larger processing delay.

Furthermore, the priority to be assigned may be changed in accordance with the process load status of the information processing apparatus 510 of the order destination. For example, when the process load is high, raising the priority of the task of the own apparatus can prevent processing interruption due to an order of a distributed process from another information processing apparatus 510, so that the process corresponding to the input signal of the device 160 connected to the own apparatus can be performed without delay. On the contrary, when the own apparatus is capable of executing another process since the process load is low, by lowering the priority of the task of the own apparatus and raising the priority of the task in the distributed process of the other information processing apparatus 510, the process of the other information processing apparatus 510 can be executed with priority.

The computing unit 522 allocates the computing resources 121 to the tasks included in the computation waiting task priority queue in order of priority and sequentially executes the tasks (S91). Then, the process proceeds to step S43.

Steps S43 and S44 shown in FIG. 13 are similar to steps S43 and S44 shown in FIG. 7.

As described above, according to Embodiment 5, the computing unit 522 is configured to execute a target process on the corresponding data in accordance with the priority assigned to the target process, and even when the execution of a process is ordered by another information processing apparatus 510, allocates a priority to the ordered process, and executes the process according to the assigned priority. Thus, each information processing apparatus 510 can flexibly change the priorities of the processes to be executed and execute the processes.

Specifically, by setting the task priority, a process can be executed according to the importance or delay status of the process. Therefore, interruption due to the execution of a distributed process can be prevented.

DESCRIPTION OF REFERENCE CHARACTERS 100, 200, 300, 400, 500 distributed information processing system, 101 network, 110, 210, 310, 410, 510 information processing apparatus, 111 device I/F unit, 112 communication I/F unit, 120, 520 process execution unit, 121 computing resources, 122, 522 computing unit, 130 process load management unit, 131 execution state storage unit, 132 process order issuance determination unit, 133 estimated reply time computing unit, 140, 240, 340, 440 order processing unit, 141, 241 request processing unit, 142, 242, 342, 442 order destination selecting unit, 243 order process record information storage unit, 244 management information storage unit, 245 request destination selecting unit

What is claimed is:

1. An information processing method to execute a process in a distributed manner with n information processing apparatuses (n is an integer greater than or equal to 2) to be connected to a network, the information processing method being performed by each of the n information processing apparatuses, the information processing method comprising:

referring to management information to select, as m information processing apparatuses (m is an integer satisfying $1 \leq m \leq n-1$) suitable for executing a first process on first data out of n−1 information processing apparatuses, the n−1 information processing apparatuses being the n information processing apparatuses other than the information processing apparatus, the store management information including information indicating types, a number, and attributes of one or more computing resources provided for executing processes in each of the n information processing apparatuses and information indicating whether or not each of the n information processing apparatuses are able to accept a process execution order;

sending a first process distribution request to the m information processing apparatuses in the n information processing apparatuses, the first process distribution request being a request for ordering execution of the first process on the first data;

receiving, as a response to the first process distribution request, a first estimated reply time calculated as a time required to receive the transfer of the first data and to reply with a first process result obtained by executing the first process on the first data;

using the first estimated reply time to select an order destination to which the execution of the first process is to be ordered out of the m information processing apparatuses; and ordering the execution of the first process on the first data to the order destination, wherein, the m information processing apparatuses are selected, by referring to the management information, depending on whether or not each of the n−1 information processing apparatuses satisfies conditions of types, a number, and performance of the one or more computing resources required for process execution and whether or not the n−1 information processing apparatuses are capable of accepting the process execution order.

2. An information processing apparatus used as one of n information processing apparatuses (n is an integer greater than or equal to 2) in an information processing system that executes a process in a distributed manner with the n information processing apparatuses to be connected to a network, comprising:

processing circuitry to perform communication with the network;

to store management information including information indicating types, a number, and attributes of one or more computing resources provided for executing processes in each of the n information processing apparatuses and information indicating whether or not each of the n information processing apparatuses are able to accept a process execution order;

to refer to the management information to select, as m information processing apparatuses (m is an integer satisfying 1≤m≤n−1) suitable for executing a first process on first data out of n−1 information processing apparatuses, the n−1 information processing apparatuses being the n information processing apparatuses other than the information processing apparatus;

to send a first process distribution request to m information processing apparatuses, the first process distribution request being a request for ordering execution of the first process on the first data;

to receive, as a response to the first process distribution request, a first estimated reply time calculated as a time required to receive the transfer of the first data and to reply with a first process result obtained by executing the first process on the first data;

to use the first estimated reply time to select an order destination to which the execution of the first process is to be ordered out of the m information processing apparatuses; and to order the execution of the first process on the first data to the order destination, wherein the processing circuitry refers to the management information to select the m information processing apparatuses depending on whether or not each of the n−1 information processing apparatuses satisfies conditions of types, a number, and performance of the one or more computing resources required for process execution and whether or not the n−1 information processing apparatuses are capable of accepting the process execution order.

3. The information processing apparatus according to claim 2, wherein the m information processing apparatuses are the n information processing apparatuses except the information processing apparatus.

4. The information processing apparatus according to claim 2, wherein the processing circuitry stores order process record information relating to record of the distributed process with any of the n information processing apparatuses; and the processing circuitry refers to the order process record information to select, as the m information processing apparatuses, one or more information processing apparatuses suitable for executing the first process out of the n information processing apparatuses.

5. The information processing apparatus according to claim 2, wherein the processing circuitry executes a target process on corresponding data according to a priority assigned to the target process, and when execution of a second process on a second data is ordered by a single information processing apparatus in the n information processing apparatuses, the processing circuitry assigns a priority to the second process and executes the second process on the second data according to the priority assigned to the second process.

6. The information processing apparatus according to claim 2, wherein the processing circuitry selects, as the order destination, the information processing apparatus responded with a shortest first estimated reply time out of the m information processing apparatuses when the shortest first estimated reply time is equal to or less than a predetermined threshold time.

7. The information processing apparatus according to claim 6, wherein, in a case where the first process result is not received for a predetermined period of time since the processing circuitry ordered the execution of the first process on the first data to the order destination, the processing circuitry orders the execution of the first process on the first data to another information processing apparatus in the n information processing apparatuses.

8. The information processing apparatus according to claim 2, wherein the processing circuitry selects the information processing apparatus as the order destination when a shortest first estimated reply time is longer than a predetermined threshold time.

9. The information processing apparatus according to claim 2, wherein the processing circuitry selects, as the order destination, an information processing apparatus which responds first with the first estimated reply time satisfying a predetermined order destination condition out of the m information processing apparatuses.

10. The information processing apparatus according to claim 9, wherein the processing circuitry selects the information processing apparatus as the order destination in a case where no information processing apparatus responds with the first estimated reply time satisfying the predetermined order destination condition in the m information processing apparatuses.

11. The information processing apparatus according claim 2, the processing circuitry executes a process of data;

the processing circuitry manages a process load; and the processing circuitry sends the first process distribution request to the m information processing apparatuses when the process load reaches or exceeds a predetermined threshold value.

12. The information processing apparatus according to claim 11, wherein the processing circuitry calculates, when receiving a second process distribution request for ordering execution of a second process on a second data from a single information processing apparatus in the n information processing apparatuses, a time required for the processing circuitry to receive the transfer of the second data and to reply with a second process result obtained by executing the second process on the second as a second estimated reply time, and the processing circuitry sends the second estimated reply time to the single information processing apparatus.

13. A non-transitory computer-readable storage medium storing program to cause a computer to function as an information processing apparatus of n information processing apparatuses (n is an integer greater than or equal to 2) in an information processing system to execute a process in a distributed manner with the n information processing apparatuses to be connected to a network, the program causing the computer to function as:

processing circuitry to perform communication with the network;

to store management information including information indicating types, a number, and attributes of one or more computing resources provided for executing processes in each of the n information processing apparatuses and information indicating whether or not each of the n information processing apparatuses are able to accept a process execution order;

to refer to the management information to select, as m information processing apparatuses (m is an integer satisfying 1≤m≤n−1) suitable for executing a first process on first data out of n−1 information processing apparatuses, the n−1 information processing apparatuses being the n information processing apparatuses other than the information processing apparatus;

to send a first process distribution request to m information processing apparatuses, the first process distribution request being a request for ordering execution of the first process on the first data;

to receive, as a response to the first process distribution request, a first estimated reply time calculated as a time required to receive the transfer of the first data and to reply with a first process result obtained by executing the first process on the first data;

to use the first estimated reply time to select an order destination to which the execution of the first process is to be ordered out of the m information processing apparatuses; and to order the execution of the first process on the first data to the order destination, wherein the processing circuitry refers to the management information to select the m information processing apparatuses depending on whether or not each of the n−1 information processing apparatuses satisfies conditions of types, a number, and performance of the one or more computing resources required for process execution and whether or not the n−1 information processing apparatuses are capable of accepting the process execution order.

14. An information processing system to execute a process in a distributed manner with n information processing apparatuses (n is an integer greater than or equal to 2) to be connected to a network, each of the n information processing apparatuses comprising:

processing circuitry to perform communication with the network;

to store management information including information indicating types, a number, and attributes of one or more computing resources provided for executing processes in each of the n information processing apparatuses and information indicating whether or not each of the n information processing apparatuses are able to accept a process execution order;

to refer to the management information to select, as in information processing apparatuses (m is an integer satisfying 1≤m≤n−1) suitable for executing a first process on first data out of n−1 information processing apparatuses, the n−1 information processing apparatuses being the n information processing apparatuses other than the information processing apparatus;

to send a first process distribution request to m information processing apparatuses, the first process distribution request being a request for ordering execution of the first process on the first data;

to receive, as a response to the first process distribution request, a first estimated reply time calculated as a time required to receive the transfer of the first data and to reply with a first process result obtained by executing the first process on the first data;

to use the first estimated reply time to select an order destination to which the execution of the first process is to be ordered out of the m information processing apparatuses; and to order the execution of the first process on the first data to the order destination, wherein the processing circuitry refers to the management information to select the m information processing apparatuses depending on whether or not each of the n−1 information processing apparatuses satisfies conditions of types, a number, and performance of the one or more computing resources required for process execution and whether or not the n−1 information processing apparatuses are capable of accepting the process execution order.

* * * * *